Nov. 25, 1930.  A. H. CHAPPELKA  1,782,679
HOIST
Filed Dec. 21, 1928  3 Sheets-Sheet 1
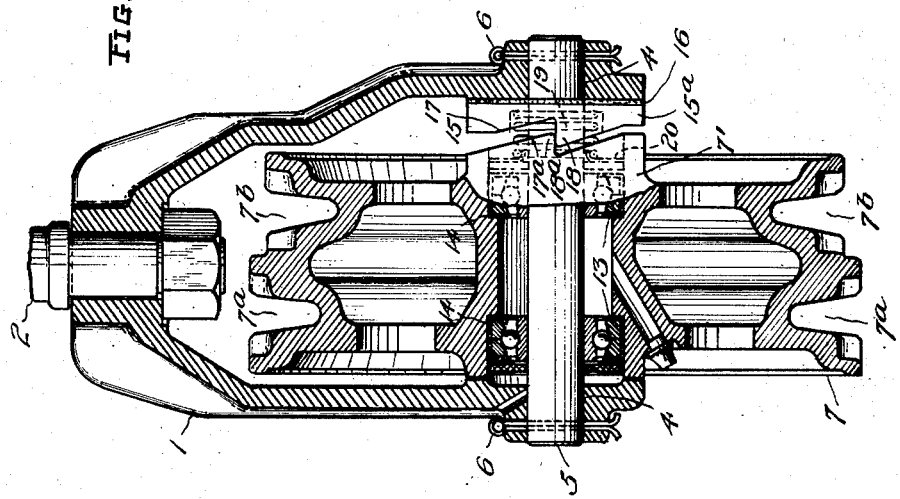
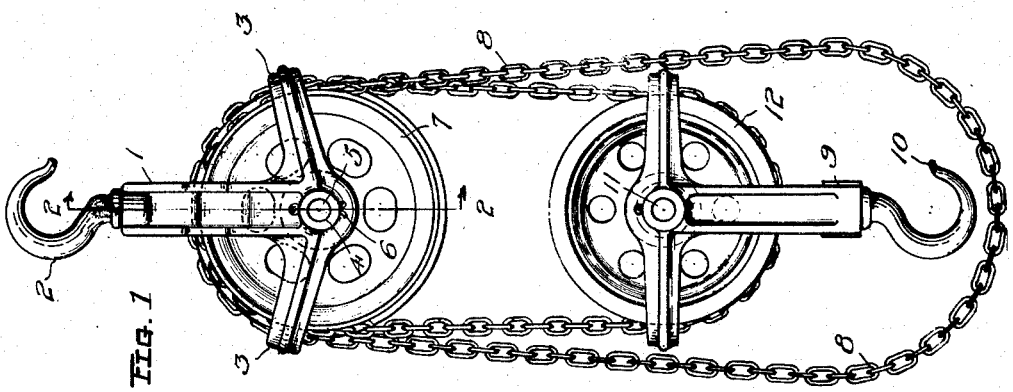
INVENTOR
Arthur H. Chappelka
BY
Fro. B. Pitts
ATTORNEY Nov. 25, 1930.  A. H. CHAPPELKA  1,782,679
HOIST
Filed Dec. 21, 1928  3 Sheets-Sheet 2

INVENTOR
Arthur H. Chappelka
By
Geo. B. Pitts
ATTORNEY

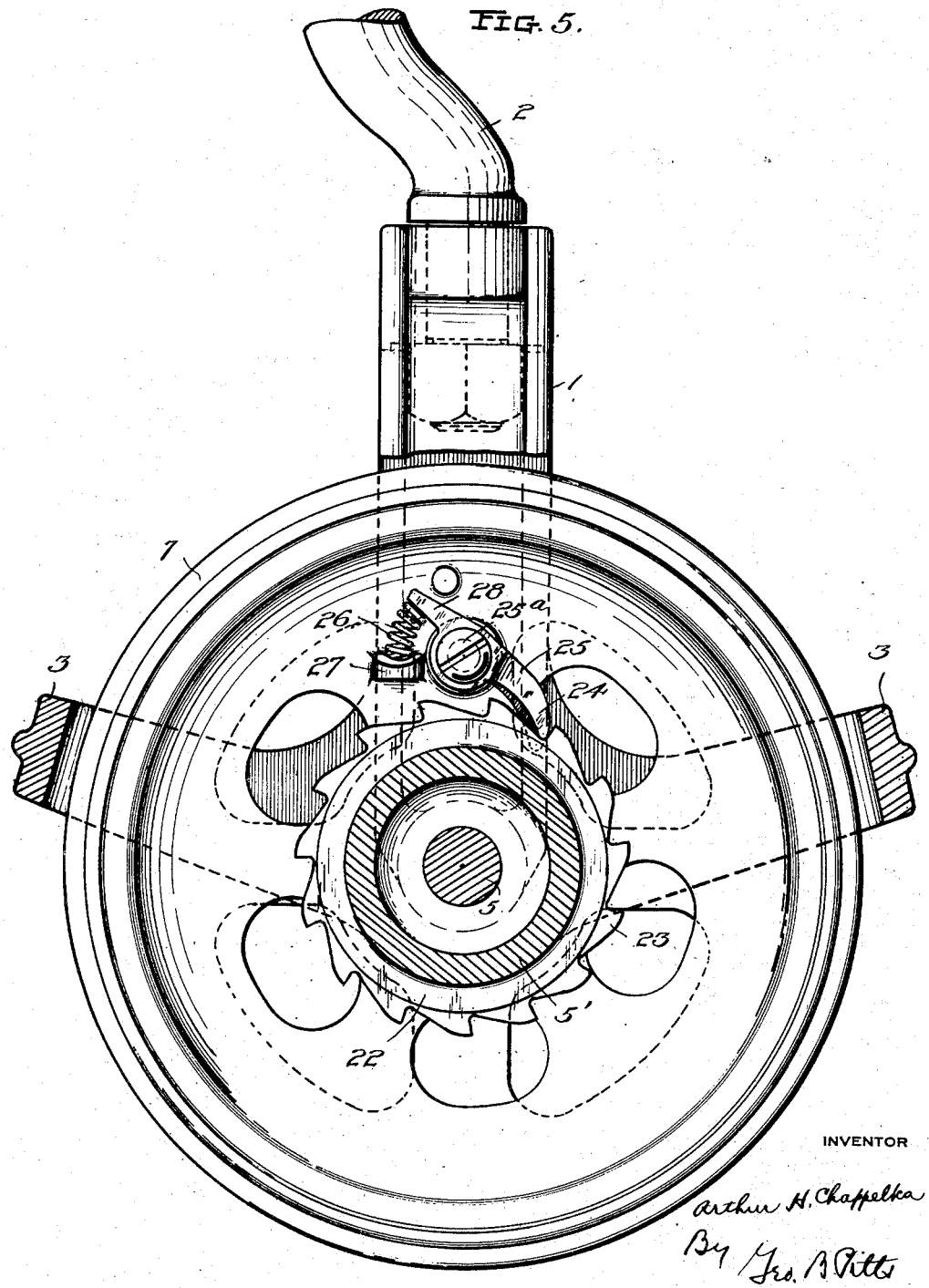

Patented Nov. 25, 1930

1,782,679

UNITED STATES PATENT OFFICE

ARTHUR H. CHAPPELKA, OF LAKELINE, OHIO

HOIST

Application filed December 21, 1928. Serial No. 327,676.

This invention relates to a mechanism for raising and lowering loads. The invention is shown by me for illustrative purposes as applied to a hoist for raising and lowering loads vertically and wherein the load engaging member is suspended by a flexible member.

One object of the invention is to provide between a rotatable element of such mechanism and its support, anti-friction bearings and means arranged to impede the rotation of the element in one direction.

Another object of the invention is to provide a mounting for a rotatable element of a hoist so arranged that such element rotates on anti-friction bearings when rotating in the direction to lift the load, whereby the required power to effect lifting is reduced, but such element is frictionally impeded when moving in the opposite direction, whereby the reduction of friction incident to the use of anti-friction bearings is counteracted sufficiently to sustain the load in any desired elevated position without danger of its gravitating.

Another object of the invention is to provide in a hoist an improved mounting for one or more of its rotatable elements comprising anti-friction bearings and a friction means arranged to be effective when the power for raising the load is cut off to prevent such element or elements from rotating due to the weight of the load.

Another object of the invention is to provide sets of bearings for a rotatable element so arranged and controlled that the element rotates on certain of the bearings when rotating in one direction and rotates on the other bearings when rotating in the opposite direction.

Another object of the invention is to provide a hoist having an improved mounting for one or more of its rotatable elements that is relatively simple and capable of controlling the rotation of such element or elements to reduce the required power to lift a load or to sustain the load against gravitation.

Other objects of the invention will be apparent to those skilled in the art to which this invention relates from the following description taken in connection with the accompanying drawings wherein Fig. 1 is a side view of a hoist embodying my invention.

Fig. 2 is a section on the line 2—2 of Fig. 1, enlarged.

Fig. 5 is a section on the line 5—5 of Fig. 4.

Figure 3:
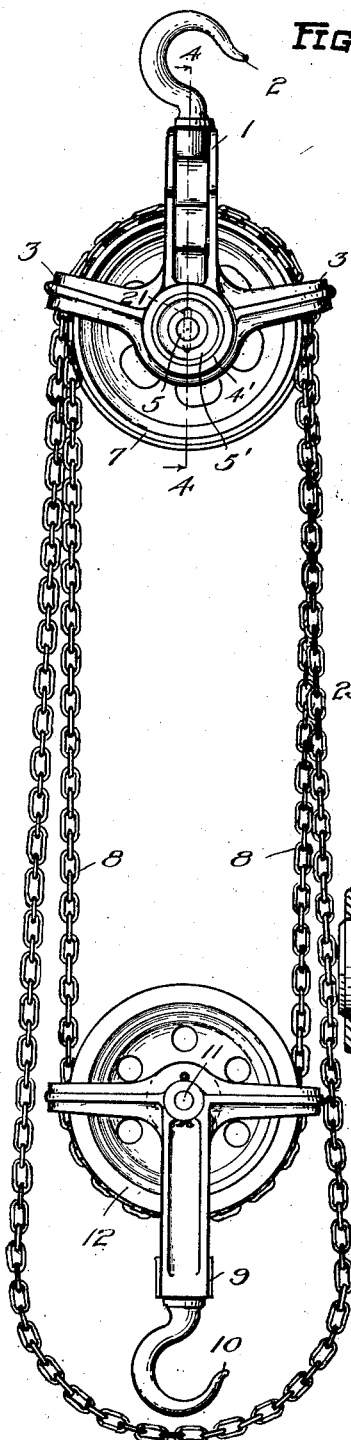
Fig. 3 is a side view of a hoist of a different construction also embodying my invention.

It will be understood that there are several different types of hoists, for example, the differential type and screw or worm gear type and each thereof may have one yoke or frame for one or more rotatable elements or upper and lower yokes or frames each supporting one or more rotatable elements. My invention is applied to the mounting and control of one of these rotatable elements and in describing and illustrating herein a differential type of hoist and describing my invention in connection therewith and also in connection with the rotatable member carried by the upper yoke, I do not wish to be understood as limiting my invention thereby.

In the drawings, 1 indicates a yoke or frame having a supporting hook 2 and guards 3 and aligned openings 4 for a shaft 5, which, in the form of construction shown in Figs. 1 and 2, may be fixed in such openings against rotation by cotter pins 6. 7 indicates a rotatable element having in its periphery chain pockets $7^a$, $7^b$, having different diameters, to provide a differential movement in a well-known manner.

8 indicates the flexible member, such as a chain, having portions fitting within the chain pockets $7^a$, $7^b$. 9 indicates the lower yoke or frame from which depends a load engaging device such as a hook 10. 11 indicates a shaft supported by the yoke 9, and 12 indicates an element rotatably mounted on the shaft 11. As shown the flexible member 8 leads from one side of the pocket $7^a$ to and around the element 12 and then to the pocket $7^b$. As the flexible member is endless, pull on the left hand leg of the flexible member 8 will raise the load engaged by the device 10 or pull on the right hand leg of the member 8 will lower the load.

13 indicates a pair of anti-friction bearings on which the rotatable element 7 rotates, suitable seats 14 being provided in the hub 7' of the element to accommodate the outer races of the bearings. 15 indicates as an entirety means for impeding the rotation of the element 7 in one direction, so arranged that they are ineffective when the element 7 is rotating in that direction to lift a load engaged or carried by the device 10, but automatically effective when rotating in the opposite direction to compensate for the reduction in friction resulting from the use of anti-friction bearings, so that the load will remain suspended in any position to which it may be elevated, without being locked in any such position, instead of gravitating downwardly, at the same time permitting the load to be raised or lowered by simply a pull on one or the other legs of the flexible member.

In the form of construction shown in Figs. 1 and 2 the retarding means comprises the following instrumentalities: 15ª indicates a collar loosely mounted on the shaft 5 whereby it may rotate and slide endwise thereon, its outer face being flat or planular and bearing against a similar surface provided on the inner side of the adjacent yoke arm surrounding the opening 4 therein or (and by preference) a disk 16 of suitable friction material. The inner face of the collar 15ª is provided with one or more cam surfaces 17 and one or more abutments 18 with which co-act complemental elements 17ª, 18ª, respectively, carried by the adjacent end of the hub 7'. 19 indicates a spring coiled around the shaft 5 and abutting against the dust plate 20 for the adjacent bearing 13 and the collar 15ª and normally tending to move the latter away from the cam surfaces 17ª and in contact with the friction disk 16 to maintain slight pressure between it and the yoke arm.

The operation of the form of construction shown in Figs. 1 and 2 is as follows: When the pull is applied to the left hand leg of the flexible member 8 to lift the load, the abutment 18ª engages the abutment 18 and rotates the collar 15ª therewith permitting the element to freely rotate on the bearings. If the pull is stopped, the weight of the load will rotate the element 7 in the opposite direction until the cam surfaces 17ª engage with the cam surfaces 17 the effect of which is to force the collar 15ª outwardly against the yoke arm, the resulting friction being sufficient to prevent rotation of the element 7 incident to the gravitation of the load, thereby making it necessary to pull on the right hand leg of the flexible member 8, when it is desired to lower the load.

Figure 4:
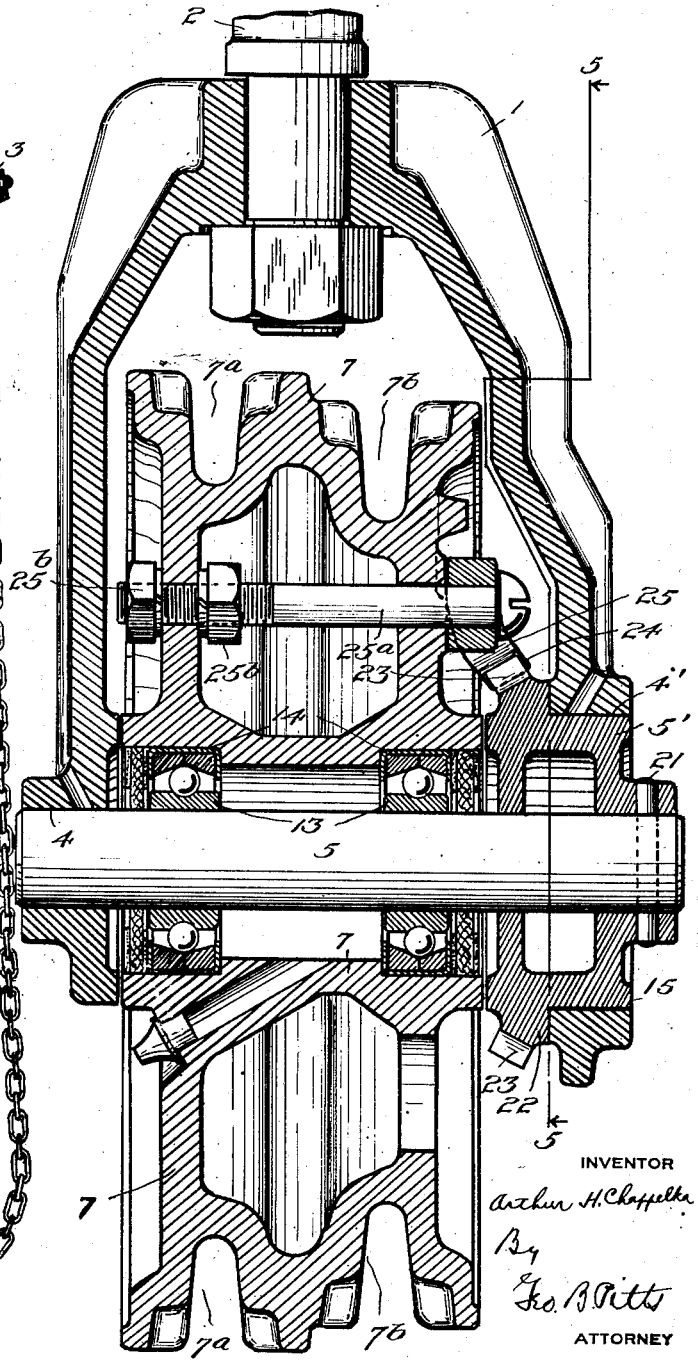
Fig. 4 is a section on the line 4—4 of Fig. 3, enlarged.

In the form of construction shown in Figs. 3, 4 and 5, the impeding means 15 consists of plain bearings so arranged and controlled by the rotatable element 7 that they form the bearing elements therefor when such element is rotating in the direction to lower the load and hence set up sufficient friction between it and the yoke to prevent lowering of the load due to gravitation thereof. In this form of construction the shaft 5 is rotatably supported in plain bearings at its opposite ends in the openings 4 of the arms of the yoke 1, the opening in one arm being preferably enlarged as shown at 4', and the adjacent end of the shaft 5 carries a collar 5' rotatable in such opening, the collar 5' being fixed to the shaft 5 in any desired manner, as by means of a pin 21. The inner end of the collar 5' is provided with a rim 22 which forms a shoulder fitting against the inner surface of the adjacent yoke arm to prevent outward movement of the collar and its side edge or periphery is provided with ratchet teeth 23 with which engages the nose 24 of a pawl 25 pivoted on the web or spoke of the rotatable element 7, the nose 24 being normally pressed toward the teeth 23 by a coiled spring 26 interposed between a suitable abutment 27 provided on the element 7 and the tail 28 of the pawl. The pawl 25 is loosely pivoted on a pin such as a bolt 25ª extending through aligned openings in the spaced spokes of the rotatable element 7 and secured to the remote spoke by nuts 25ᵇ, as shown in Fig. 4.

The operation of the form of construction shown in Figs. 3, 4 and 5 is as follows: When pull is applied to the left hand leg of the flexible member 8 to lift a load, the rotatable element 7 will rotate on the anti-friction bearings 13 (counter-clockwise as shown in Fig. 5) and the pawl 25 will ride the teeth 23, the shaft 5 and collar 5' remaining stationary, but in the rotation of the element 7 in the opposite direction, the nose of the pawl 25 will engage with the teeth 23 and will lock the collar 5' to the element 7 so that it and the shaft 5 will rotate as a unit, in the bearings 4 and 4' and the anti-friction bearings 13 will become inactive. Accordingly, it will be seen that in one direction of rotation, that is the direction to lift the load, the element 7 rotates on the anti-friction bearings 13 and in the opposite direction it rotates on the plain bearings 4, 4', whereby sufficient friction is set up to sustain the load in any desired elevation without danger of the load gravitating.

From the foregoing description it will be noted that the rotatable element 7 is so mounted that in the direction of rotation requiring the application of power to lift the load, the friction between the relatively rotatable parts is reduced, this being particularly advantageous where the load is manually raised, as in a chain hoist such as shown and described herein; but when rotating in the opposite direction I provide for sufficient friction so that such element cannot coast or rotate due to the weight of the load or the load engaging element. At the same time it will be noted that the rotatable element 7 is rotatable in the direction to lower the load upon the application of the power thereto without requiring the release of any locking device or other mechanism.

It will also be noted that in my construction I provide between the rotatable element and another element which has bearing upon or in one arm of the supporting yoke or frame interlocking devices the co-action of which are controlled by the rotatable element so that in one direction of rotation thereof the impeding means are ineffective and in the opposite direction of rotation such means are effective and hence these means are automatically controlled or actuated only when the application of power to lift the load ceases and serves to maintain the load in its elevated position without affecting the normal operation of the rotating element when power is applied to or through it to lower the load.

To those skilled in the art to which my invention relates many changes in construction and widely differing embodiments and applications of the invention will suggest themselves without departing from the spirit and scope of my invention. My disclosures and the description herein are purely illustrative and are not intended to be in any sense limiting.

What I claim is:

1. In a differential hoist, the combination of a support, a shaft rotatably mounted on said support, a rotatable element, anti-friction bearings between said shaft and said element, impeding means comprising a rotatable device having frictional engagement with said support, and interlocking means between said rotatable element and said device and co-operable to make the impeding means effective when said element rotates in one direction.

2. In a hoist, the combination of a support, a shaft rotatably mounted in said support, a rotatable element adapted to be engaged by a flexible member, anti-friction bearings between said shaft and said element to permit rotation of the latter on said shaft, and means automatically controlled by the rotation of said element for locking it and said shaft together when rotating in one direction.

3. In a hoist, the combination of a support having spaced arms formed with bearing openings, one being relatively large, a shaft having fixed to it at one end a collar rotatably fitting said relatively large opening in one of said arms and rotatably mounted at its opposite end in the opening in the other arm, a rotatable element adapted to be engaged by a flexible member, anti-friction bearings for rotatably supporting said element on said shaft, and means between said element and said collar for locking them together when a force is applied to rotate said element in one direction, said locking means being ineffective when said element rotates in the opposite direction.

4. In a hoisting mechanism, the combination of a support having spaced arms, a shaft mounted in said arms, a rotatable element having chain pockets adapted to be engaged by a chain, anti-friction bearings between said shaft and said element, and a pair of interlocking devices, one of said devices being mounted on and surrounding said shaft and the other device being carried by and rotatable with said rotatable element and effective through its engagement with the first device, when said element rotates in one direction to impede its rotation, but being ineffective when said element rotates in the opposite direction.

5. In a hoisting mechanism, the combination of a support having spaced arms, a shaft rotatably mounted in said arms, a rotatable element adapted to be engaged by a flexible member, anti-friction bearings between said element and said shaft for rotatably supporting said element thereon, and means within said spaced arms and automatically connecting the shaft and rotatable element together when pull on the flexible member produces rotative effort on said rotatable element in one direction, said connecting means being ineffective when the flexible member is pulled in the direction to rotate said rotatable element in the opposite direction.

6. In a hoisting mechanism, the combination of a support having spaced arms, a shaft rotatably mounted at its ends in said arms, a rotatable element having chain pockets adapted to be engaged by a chain, anti-friction bearings between said element and said shaft for rotatably supporting said element thereon, and means between said shaft and said rotatable element for automatically connecting them together when pull on the chain produces rotative effort on said rotatable element in one direction, said connecting means being ineffective when the chain is pulled in the direction to rotate said rotatable element in the opposite direction.

7. In a differential hoisting mechanism, the combination of a support having spaced arms, a shaft rotatably mounted on plain bearings in said arms, a rotatable wheel having chain pockets adapted to be engaged by a chain, anti-friction bearings between the hub of said wheel and said shaft for rotatably supporting said wheel thereon, and a pawl and ratchet, one secured to said shaft and the other secured to the side of said wheel for automatically connecting said wheel and said shaft together when pull on the flexible member produces rotative effort on said wheel in one direction, said pawl and ratchet being ineffective when the flexible member is pulled in the direction to rotate said wheel in the opposite direction.

8. In a hoist, the combination of a support, a rotatable element adapted to be engaged by a flexible member, a shaft for supporting said element, anti-friction bearings between said element and said shaft, said shaft being rotatably mounted at one end in said support, a collar fixed to the opposite end of said shaft and rotatably mounted in said support, and interlocking means between said element and said collar, said means being ineffective when said element rotates in one direction.

9. In a hoist, the combination of a support, a rotatable element adapted to be engaged by a flexible member, bearing means for rotatably mounting said element on said support, said bearing means comprising plain bearings, one element of which consists of a shaft, having relatively low efficiency and anti-friction bearings having relatively high efficiency, and means between said shaft and said rotatable element permitting free rotation of said element on said bearing means in one direction but stopping its rotation on said anti-friction bearings in the opposite direction.

10. In a hoist, the combination of a supporting element, a rotatable element adapted to be engaged by a flexible member, a shaft having journal bearing support in one of said elements, anti-friction bearings between said shaft and the other element, and means between said rotatable element and shaft arranged to connect them together when said rotatable element rotates in one direction, said connecting means being ineffective when said rotatable element rotates in the opposite direction.

In testimony whereof, I have hereunto subscribed my name.

ARTHUR H. CHAPPELKA.